United States Patent
Langner et al.

(10) Patent No.: US 9,242,742 B2
(45) Date of Patent: Jan. 26, 2016

(54) MEASUREMENT METHOD AND DEVICE FOR DETERMINING THE POSITION OF A PROFILE COMPONENT APPLIED TO A SHELL COMPONENT

(71) Applicant: Airbus Operations GmbH, Hamburg (DE)

(72) Inventors: Thilo Langner, Quedlinburg (DE); Mathias Mueggenburg, Quedlinburg (DE); Torben Jacob, Beckdorf (DE); Adrian Wachendorf, Hamburg (DE); Remo Hinz, Stade (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/200,653

(22) Filed: Mar. 7, 2014

(65) Prior Publication Data

US 2014/0188429 A1    Jul. 3, 2014

Related U.S. Application Data

(63) Continuation of application No. PCT/EP2012/066702, filed on Aug. 28, 2012.

(60) Provisional application No. 61/532,666, filed on Sep. 9, 2011.

(30) Foreign Application Priority Data

Sep. 9, 2011  (DE) .......................... 10 2011 112 775

(51) Int. Cl.
*B64F 5/00* (2006.01)
*G01B 11/00* (2006.01)

(52) U.S. Cl.
CPC ............ *B64F 5/0009* (2013.01); *G01B 11/002* (2013.01)

(58) Field of Classification Search
CPC .................................................... B64F 5/0009
USPC ........................................................ 702/150
See application file for complete search history.

(56) References Cited

U.S. PATENT DOCUMENTS

| 7,194,378 | B2 | 3/2007 | Gorsch et al. |
| 8,493,554 | B2 | 7/2013 | Arnold |

(Continued)

FOREIGN PATENT DOCUMENTS

| CN | 102175145 A | 9/2011 |
| DE | 195 25 987 A1 | 1/1997 |

(Continued)

OTHER PUBLICATIONS

Laser Radar MV2241260. Automated large volume inspection. Nikon Metrology NV, Geldenaaksebaan 329, B-3001 Leuven, Belgium, "Laser_Radar_EN_0410 Copyright Nikon Metrology NV", 2010.

(Continued)

*Primary Examiner* — Bryan Bui
(74) *Attorney, Agent, or Firm* — Lerner, David, Littenberg, Krumholz, & Mentlik, LLP

(57) ABSTRACT

A measurement method for determining the position of an omega profile component placed on a shell component of an aircraft, in which the ACTUAL position of the omega profile component relative to the shell component is optically acquired in a contactless manner, so as to subsequently compare the latter with a defined DESIRED position, wherein several adjacently spaced apart measuring points are established at two mutually opposing flank sides of the profile cross section of the omega profile component, through which a regression line is run according to the path measurement principle based on coordinates, whose point of intersection is drawn upon to determine the orthogonal position of the omega profile component relative to the shell component.

10 Claims, 1 Drawing Sheet

(56) References Cited

U.S. PATENT DOCUMENTS

| | | |
|---|---|---|
| 2005/0207621 A1 | 9/2005 | Murai et al. |
| 2008/0229579 A1 | 9/2008 | Pickens |
| 2010/0161095 A1 | 6/2010 | Lindgren |
| 2011/0279809 A1* | 11/2011 | Arnold .................... 356/4.01 |

FOREIGN PATENT DOCUMENTS

| | | |
|---|---|---|
| DE | 103 31 358 A1 | 2/2004 |
| DE | 10 2008 043 977 A1 | 6/2010 |
| EP | 0 147 501 A2 | 7/1985 |
| EP | 1615153 A2 | 1/2006 |
| JP | H05180634 A | 7/1993 |
| WO | 2004/020935 A1 | 3/2004 |
| WO | 2008/001043 A1 | 1/2008 |

OTHER PUBLICATIONS

Chinese Office Action dated Jul. 28, 2015.

* cited by examiner

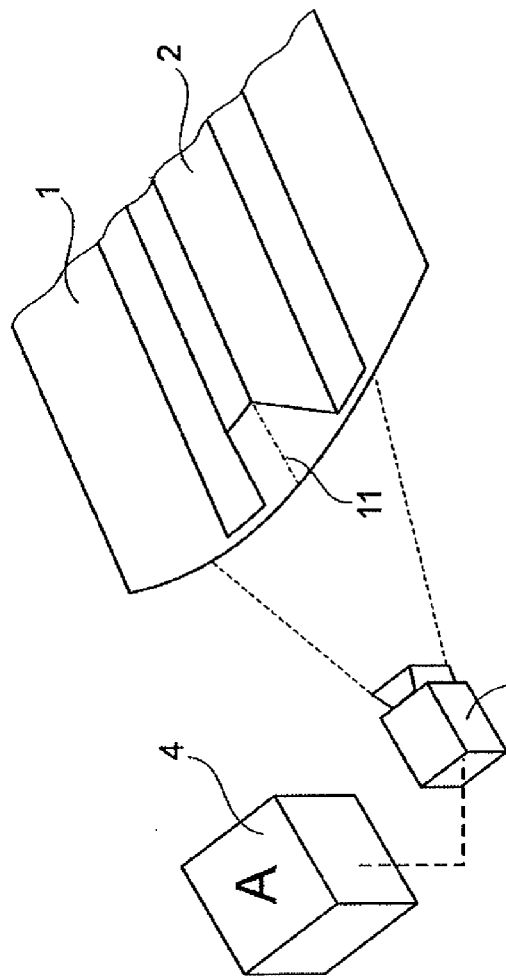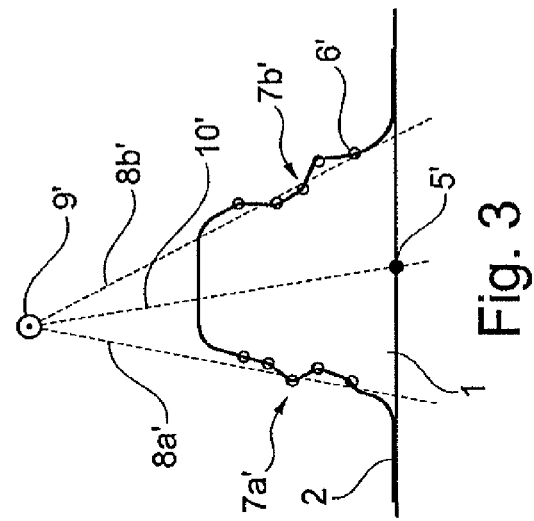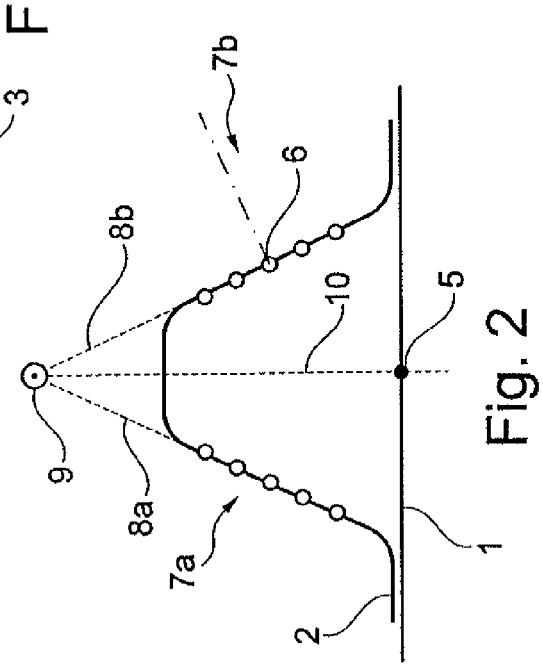

MEASUREMENT METHOD AND DEVICE FOR DETERMINING THE POSITION OF A PROFILE COMPONENT APPLIED TO A SHELL COMPONENT

CROSS-REFERENCE TO RELATED APPLICATIONS

The present application is a continuation of International Application No. PCT/EP2012/066702 filed Aug. 28, 2012 published in English, which claims the benefit of the filing date of U.S. Provisional Patent Application No. 61/532,666 filed Sep. 9, 2011 and priority from German Patent Application No. 10 2011 112 775.9 filed Sep. 9, 2011, the disclosures of which are hereby incorporated herein by reference.

FIELD OF THE INVENTION

The invention relates to a measurement method for determining the position of an omega-profile component placed on a shell component, in which the ACTUAL position of the omega profile component relative to the shell component is optically acquired in a contactless manner, so as to subsequently compare the latter with a defined DESIRED position. In addition, the invention also relates to a measurement device for implementing this measurement method, and a computer program product related thereto for the measurement device.

BACKGROUND OF THE INVENTION

The area of application for the invention extends primarily to aircraft construction. In particular commercial aircraft are fabricated using a shell type of construction with respect to the large-volume fuselages, wherein an internal reinforcement structure supports a shell component, which as the outer skin comprises the outside surface of the fuselage. The internal reinforcement structure usually consists of longitudinally running stringers and frames running transversely and roughly annularly thereto, which are joined to the shell component on the inside. In modern production technologies, at least the stringers are most often bonded to the shell component during its fabrication, so that separate attachment means, such as rivets, need not be used. Aside from T-stringers, so-called omega stringers are used for this purpose, and are here also referred to as omega profile components. Within the framework of the present invention, omega profile components are understood as cross sectional forms of profile components, which exhibit an open profile cross section, and together with the shell component yield a closed profile. For example, the profile cross sections are here symmetrical, and exhibit two nonparallel, opposing flank sides extending away from the shell component.

By comparison to the T-stringers, such profile cross sections have a greater area moment of inertia, so that they impart a high stability in particular to an aircraft structure. In a special embodiment, an omega profile component involves a reinforcement profile made out of metal or plastic with a roughly hat-shaped, symmetrical cross section. In addition to aircraft construction, these components can also be used in conjunction with other large-scale shell components from automotive engineering, ship engineering and the like. The solution according to the invention can also be applied thereto.

Known from DE 103 31 358 A1 is a method for fabricating a structural component of an aircraft fuselage, in which the stringers are bonded to the shell component in a special manufacturing process. The outer surfaces of the mold carrier with the modular profiles imbedded in annular channels are here covered with a loosely overlying film. The hollow space formed by the gaps is exposed to a vacuum in such a way as to aspirate the film over the annular channel and slits of the modular profiles. After a sufficient vacuum has been achieved, the film roller is coupled with the vacuum skin roller in such a way that the film is wound, and the vacuum skin is unwound on the outer surfaces of the modular profiles, and drawn into the profile grooves of the depressions in a dimensionally accurate manner. Stringers provided with support elements are subsequently inserted into the profile grooves covered by the vacuum skin. All fiber composite skin layers are then placed on the vacuum skin-covered outer surfaces of the modular profiles and the stringers. Finally, an optimal quantity of sealing compound is applied to the outer skin layer. A structural shell is precisely fitted onto the sealing compound, so as to compact the sealing compound in such a way as to yield a vacuum-tight seal between the vacuum skin and structural shell. After the prescribed process vacuum has been reached, the cavity between the vacuum skin and structural shell, the vacuum is also turned off, and the hollow space is opened toward the atmosphere. The structural shell can thereupon be lifted and rotated by 180°, so as to subject the latter to an injection and curing process. The finished structural shell comprised of a shell component can subsequently be removed from the mold with stringers.

Before curing and/or after fabricating such a structural component, the stringer position relative to the shell component must be measured, in order to run a quality control for dimensional accuracy. This had previously been accomplished in complicated manual measurements by means of a photometric procedure, in which markings must first be provided to the stringer face and shell component, which are subsequently acquired by a picture camera and evaluated through image processing.

However, the present invention can also be used independently of the so-called AutoVac process described above. The basic application involves a shell component with omega profile components, regardless of the method used in their fabrication.

BRIEF SUMMARY OF THE INVENTION

Therefore, an aspect of the present invention is to create a measurement method and measurement device for determining the position of a special omega profile component placed on a shell component, which permit a rapid and precise contactless measured value acquisition.

Aspects of the present invention encompass the procedural instruction that several adjacently spaced apart—i.e., several individually arranged—measuring points are used at two mutually opposing flank sides of the profile cross section of the omega profile component, thereby yielding a regression line whose point of intersection is drawn upon to determine the position of the omega profile component relative to the shell component. In other words, no previously applied adhesive measuring points are used for image processing; the measuring points are instead obtained from the characteristic profile shape, specifically the mutually opposing flank sides. Naturally, the flank sides for implementing the measurement method according to an aspect of the invention must not run parallel to each other, since there would otherwise be no point of intersection between the connecting lines. Furthermore, a spatial coordinate, for example a z-coordinate, should be prescribed or set as a constant, so that a 2D sectional plane results, and the regression lines intersect in the respective 2D sectional plane. Orthogonality is typically ensured in the 2D sectional plane. The point of intersection obtained over the flank sides of the omega profile component represents the position of the omega profile component in the respective 2D sectional plane relative to the shell component, and is correlated herewith. For example, stringers or other components whose position relative to a shell component is to be determined can be designated as an omega profile component.

This is preferably done by running a bisecting line through the point of intersection in the direction of the shell component, so as to mark an ACTUAL position point on the shell component in the profile cross section that corresponds to the ACTUAL positions of the omega profile component.

This ACTUAL position point is preferably compared with a DESIRED position point corresponding to the DESIRED position of the omega profile component by means of a CAD model, so as to determine a positional deviation at the site of the profile cross section. As a consequence, the quality control performed after the manufacturing process involves the ACTUAL/DESIRED comparison between the position points. The DESIRED position points employed for comparison purposes can here be derived from a CAD model of the component to be fabricated, by virtue of establishing the ideal DESIRED measuring points on the omega profile component based thereupon. In other words, the CAD model is used to set the DESIRED measuring points through which the connecting line is drawn so as to determine the shared point of intersection, whose bisecting line then defines the DESIRED position point on the shell component.

In order to realize the solution according to an aspect of the invention, which preferably can be done based upon the mathematical calculation and contactless, coordinate-based measuring point acquisition of the profile cross section, and hence with software, the shell component does not have to be directly accessible, and nor must it be stepped on or touched during the measurement. In the solution according to an aspect of the invention, the measuring points at the respective site of the omega profile component lie exclusively in a plane situated perpendicular to the profile, thereby enabling an especially correct evaluation and computation of the ACTUAL position points for the omega profile component. The contactless, coordinate-based position determination of the omega profile component can be integrated into the production sequence without any further disruption, and is reproducible with a high degree of precision. This makes it possible to correctly compare various similar structural components with each other. The position of the omega profile component is always determined at the same site, which lies exactly in a perpendicular plane along the axis of the omega profile component.

According to one measure of the invention, the progression of the omega profile component can be measured, i.e., the central line along which the omega profile component runs along the shell component. For this purpose, several ACTUAL position points determined along the omega profile component form an ACTUAL central line, which is compared with a DESIRED central line to ascertain a positional deviation in the progression of the omega profile component, i.e., in a manner similar to the determination of positional deviation at a site of the profile cross section, as described above.

The calibrated ACTUAL position points for determining the ACTUAL central line should preferably be spaced between 0.2 and 1.2 meters apart from each other, so as to calibrate a 10 to 30 meter long omega profile component in a metrologically correct manner with respect to the progression of the omega profile component.

Another measure of the invention proposes that the regression lines drawn upon to obtain the point of intersection be established between the measuring points arranged next to each other by means of the BestFit method. In general, three to seven measuring points are sufficient for determining the averaged progression of the respective regression lines based on the BestFit method. In the BestFit method, a progression of lines is set up in such a way as to yield the smallest possible distances between the progression of lines and the respective measuring point, which in reality cannot lie precisely on a line.

In terms of equipment, the measurement method described above can be implemented with a measuring unit, for example a contactless one that operates based on the principle of frequency modulation (FM). This measuring unit has placed downstream from it an electronic evaluating unit for performing the procedural steps according to the invention. The stored DESIRED position points are first used to establish the ACTUAL position points on the flank sides of the profile cross section of the omega profile. This can be accomplished with a laser radar, preferably in the "surface vector intersection (SVI)" measuring mode. In this special measuring mode, the laser radar unit scans along the normal vector in the DESIRED measuring point until the laser beam hits the material of the omega profile component, and then conducts the measurement. Among other things, this ensures that all ACTUAL measuring points lie exactly in one plane, specifically the sectional plane. The laser radar unit can be a commercially available, non-tactile operating mobile coordinate measuring instrument.

BRIEF DESCRIPTION OF THE DRAWINGS

The invention will be explained in greater detail below in conjunction with the description of a preferred exemplary embodiment of the invention based on the figures. Shown on:

FIG. 1 is a schematic perspective view of an omega profile component with measurement device placed on a shell component, FIG. 2 is a schematic top view of the omega profile component placed on the shell component in a profile cross section for determining the DESIRED position point, FIG. 3 is a schematic top view of the omega profile component placed on the shell component in a profile cross section for determining the ACTUAL position point.

DETAILED DESCRIPTION

According to FIG. 1, a shell component 1 of an aircraft sectionally depicted here has placed upon it an omega profile component 2, for example a stringer or longitudinal girder component, with a characteristically hat-shaped cross sectional profile, whose position relative to the shell component 1, for example the skin shell of an aircraft, is to be measured. Used to this end is a measuring unit 3 configured as a laser radar unit, which frontally acquires the profile cross section of the omega profile component 2. The measured data acquired by the measuring unit 3, for example, 3D coordinates, are evaluated in a downstream evaluating unit 4, so as to compare the ACTUAL position of the omega profile component 2 on the shell component 1 with the prescribed DESIRED position.

Several position points in the cross sectional profile at various sites along the omega profile component 2 that designate the ACTUAL position of the omega profile component characterize an ACTUAL central line 11, which can be compared with a DESIRED central line so as to determine a positional deviation in the progression of a stringer, for example.

According to FIG. 2, the DESIRED position of the omega profile component 2 relative to the shell component 1 is derived from a CAD model that prescribes the desired position, in which a DESIRED position point 5 clearly denoting the correct position of the omega profile component 2 relative to the shell component 1 is determined in the CAD model for comparison purposes.

In order to derive the DESIRED position point 5, five measuring points 6 spaced equidistantly apart from each other are first established on the two opposing, non-parallel flank sides 7a and 7b of the profile cross section of the omega profile component 5. In the SVI measuring mode of the measuring unit 3 (not shown in any greater detail), the laser radar scans along a normal vector 8 in each measuring point 6, until the laser beam hits the material of the omega profile component 2, and then performs the measurement. This ensures that all measuring points 6 lie in exactly one sectional plane.

A regression line 8a and 8b is subsequently drawn through the series of measuring points 6 on each flank side 7a and 7b, wherein its point of intersection 9 is used to determine the position of the omega profile component 2 relative to the shell component 1 establishing a bisecting line 10 through the point of intersection 9 in the direction of the shell component 1. The point of intersection between the bisecting line 10 and the shell component 1 denotes the DESIRED position point 5.

The ACTUAL position point 5' visible on FIG. 3 is ascertained based on the real conditions for the ACTUAL position of the omega profile component 2 relative to the shell component 1. The mutually opposing flank sides 7a' and 7b' deviate from the desired value in terms of the flank angle and surface flatness. In order to generate a straight line out of the measuring points 6' thus not lying exactly on a straight line, a regression line of measuring points 6' is generated using the BestFit method. Exaggeratedly depicted, the point of intersection 9' for the two regression lines 8a' and 8b' therefore lies outside the component symmetry, and the bisecting line 10' marks the ACTUAL position point 5' being sought in the point of intersection with the shell component 1.

In addition, let it be noted that "encompassing" does not preclude any other elements or steps, and that "a" or "an" do not rule out a plurality. Let it further be noted that features or steps described with reference to one of the above exemplary embodiments can also be used in combination with other features or steps of other exemplary embodiments described above. Reference numbers in the claims are not to be construed as a limitation.

REFERENCE LIST

1 Shell component
2 Omega profile component
3 Measuring unit
4 Evaluating unit
5 Position point
6 Measuring point
7 Flank side
8 Regression lines
9 Point of intersection
10 Normal vector
11 Central line

The invention claimed is:

1. A measurement method for determining an ACTUAL position (5') of an omega profile component (2) relative to a shell component (1), the method comprising:

optically acquiring, via a measuring unit, in a contactless manner, a profile cross section of the omega profile component (2), the measuring unit frontally acquiring the profile cross section, the omega profile component (2) being placed on the shell component in the ACTUAL position;

establishing, by an evaluating unit (4) coupled to said measuring unit (3), a plurality of adjacently spaced apart measuring points (6, 6') at first and second mutually opposing flank sides (7a, 7a', 7b, 7b') of the profile cross section of the omega profile component (2);

extending, via the evaluating unit (4), a first regression line (8a, 8a'), through the measuring points (6, 6') on the first flank side (7a, 7a');

extending, via the evaluating unit (4), a second regression line (8b, 8b') through the measuring points (6, 6') on the second flank side (7b, 7b');

determining, via the evaluating unit (4), the point of intersection (9, 9') of the first regression line (8a, 8a') and the second regression line (8b, 8b'); and determining, via the evaluating unit (4), the ACTUAL position (5') of the omega profile component (2) relative to the shell component (1) from the point of intersection (9, 9').

2. The measurement method of claim 1, further comprising extending a bisecting line (10, 10') through the point of intersection (9, 9') in the direction of the shell component (1), so as to mark a position point (5') on the shell component (1) in the profile cross section that corresponds to an ACTUAL position point (5') of the omega profile component (2).

3. The measurement method of claim 2, further comprising comparing the ACTUAL position point (5') with a DESIRED position point (5) corresponding to a DESIRED position (5) of the omega profile component (2) so as to determine a position deviation at the site of the profile cross section.

4. The measurement method of claim 2, further comprising:

ascertaining a plurality of ACTUAL position points (5') along the omega profile component (2) forming an ACTUAL central line (11); and comparing the ACTUAL central line with a DESIRED central line to ascertain a positional deviation in the progression of the omega profile component (2).

5. The measurement method of claim 4, wherein the calibrated ACTUAL position points (5') for determining the ACTUAL central line (11) are equidistantly spaced between 0.2 and 1.2 meters apart from each other given a 10 to 30 meter long omega profile component (2).

6. The measurement method of claim 1, wherein the regression lines (8a, 8a', 8b, 8b') are established between the measuring points (6, 6') arranged next to each other by the BestFit method.

7. The measurement method of claim 1, wherein the DESIRED position point (5) drawn upon for comparison purposes is defined from DESIRED measuring points (6) on an omega profile component (2) of a CAD model.

8. A system for determining the position of an omega profile component (2) applied to a shell component (1), the system comprising:

an evaluating unit (4);

a measuring unit (3) configured to optically acquire the ACTUAL position of the omega profile component (2) relative to the shell component (1) in a contactless manner, so that the ACTUAL position can subsequently be compared with a DESIRED position stored in the evaluating unit (4), the measuring unit (3) being configured to frontally acquire the profile cross section of the omega profile component (2), wherein the evaluating unit (4) is configured to:

establish a plurality of adjacently spaced apart measuring points (6, 6') at first and second mutually opposing flank sides (7a, 7a', 7b, 7b') of the profile cross section of the omega profile component (2), extend a first regression line (8a, 8a') through the measuring points (6, 6') on the first flank side (7a, 7a'), extend a second regression line (8b, 8b') through the measuring points (6, 6') on the second flank side (7b, 7b'), determine the point of intersection (9, 9') of the first regression line (8a, 8a') and the second regression line (8b, 8b'), and determine the position (5, 5') of the omega profile component (2) relative to the shell component (1) from the point of intersection (9, 9').

9. The system of claim 8, wherein the measuring unit (3) comprises a laser radar unit for the optical contactless measurement of an ACTUAL position (5'), which performs the measurement based on a normal vector in the measuring point (6, 6').

10. A non-transitory computer readable medium comprising a computer program packet for a measurement device of claim 8, configured to be operated based on a measurement method for determining the position of an omega profile component (2) placed on a shell component (1), in which the ACTUAL position (5') of the omega profile component (2) relative to the shell component (1) is optically acquired in a contactless manner, so that the ACTUAL position can subsequently be compared with a defined DESIRED position, the method comprising:

establishing a plurality of adjacently spaced apart measuring points (6, 6') at first and second mutually opposing flank sides (7a, 7a', 7b, 7b') of the profile cross section of the omega profile component (2), extending a first regression line (8a, 8a') through the measuring points (6, 6') on the first flank side (7a, 7a'), extending a second regression line (8b, 8b') through the measuring points (6, 6') on the second flank side (7b, 7b'), determining the point of intersection (9, 9') of the first regression line (8a, 8a') and the second regression line (8b, 8b'), and determining the position (5, 5') of the omega profile component (2) relative to the shell component (1) from the point of intersection (9, 9'), wherein a processing routine for ascertaining the point of intersection (9, 9') to determine the position of the omega profile component (2) is implemented via corresponding control commands for the evaluating unit (4) stored in a software.

\* \* \* \* \*